(12) United States Patent
Guiney et al.

(10) Patent No.: US 8,020,305 B2
(45) Date of Patent: Sep. 20, 2011

(54) MICROSCOPE SLIDE MARKING APPARATUS AND METHOD

(75) Inventors: Patrick Guiney, Concord, MA (US); Raymond Jenoski, Upton, MA (US)

(73) Assignee: Cytyc Corporation, Marlborough, MA (US)

( * ) Notice: Subject to any disclaimer, the term of this patent is extended or adjusted under 35 U.S.C. 154(b) by 171 days.

(21) Appl. No.: 12/535,581

(22) Filed: Aug. 4, 2009

(65) Prior Publication Data

US 2010/0031519 A1 Feb. 11, 2010

Related U.S. Application Data

(60) Provisional application No. 61/086,422, filed on Aug. 5, 2008.

(51) Int. Cl.
*G02B 21/00* (2006.01)
*G02B 21/34* (2006.01)

(52) U.S. Cl. ............. 33/18.1; 33/666; 359/368; 359/391

(58) Field of Classification Search .................. 33/18.1, 33/27.1, 666, 667; 248/224.7; 359/368, 359/391, 393
See application file for complete search history.

(56) References Cited

U.S. PATENT DOCUMENTS

| | | | | | |
|---|---|---|---|---|---|
| 1,129,742 | A | * | 2/1915 | Sheaff | 33/228 |
| 2,364,497 | A | * | 12/1944 | Wahnish et al. | 33/677 |
| 3,153,860 | A | * | 10/1964 | Sidlauskas | 33/677 |
| 3,438,690 | A | * | 4/1969 | Skerman | 359/391 |
| 4,262,426 | A | * | 4/1981 | Miyazaki | 359/368 |
| 4,690,521 | A | * | 9/1987 | Saccomanno | 359/368 |
| 4,807,979 | A | * | 2/1989 | Saccomanno et al. | 359/368 |
| 5,574,594 | A | * | 11/1996 | Fowler et al. | 359/391 |
| 5,715,082 | A | * | 2/1998 | Saccomanno et al. | 359/391 |
| 2003/0179445 | A1 | * | 9/2003 | Maenle et al. | 359/368 |

FOREIGN PATENT DOCUMENTS

| | | | | |
|---|---|---|---|---|
| JP | 05281473 | A | * | 10/1993 |
| JP | 09073033 | A | * | 3/1997 |
| JP | 2005128348 | A | * | 5/2005 |

* cited by examiner

*Primary Examiner* — Richard A Smith
(74) *Attorney, Agent, or Firm* — Vista IP Law Group LLP

(57) ABSTRACT

A detachable microscope pen mount for marking a microscope slide includes an attachment collar configured to secure to an objective lens, a lever secured to the attachment collar, a pen holder secured to the lever, and a pen secured to the pen holder and having a pen tip, where activating the lever moves the pen tip into a field of view and lowers the pen tip onto the microscope slide. Also disclosed is a method of marking a microscope slide includes identifying an object of interest in a field of view, positioning the object of interest in a center of the field of view, inserting a pen having a pen tip along a trough into a center of the trough, lowering the pen tip onto the microscope slide, and marking the microscope slide by tracing the inside of the center of the trough. Another method of marking a microscope slide includes identifying an object of interest in a field of view, positioning the object of interest in a center of the field of view, inserting a pen having a pen tip along a trough until it reaches an outside surface of a tube in the trough, lowering the pen tip onto the microscope slide, and marking the microscope slide by tracing the outside of tube.

19 Claims, 12 Drawing Sheets

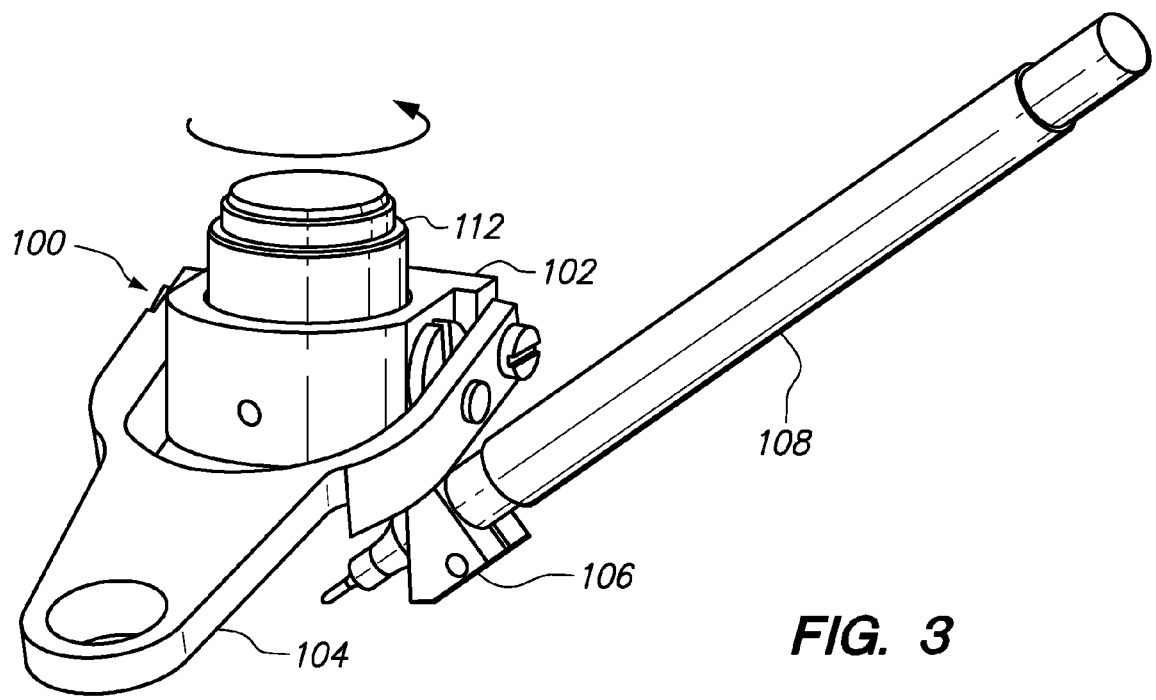
FIG. 3
FIG. 4
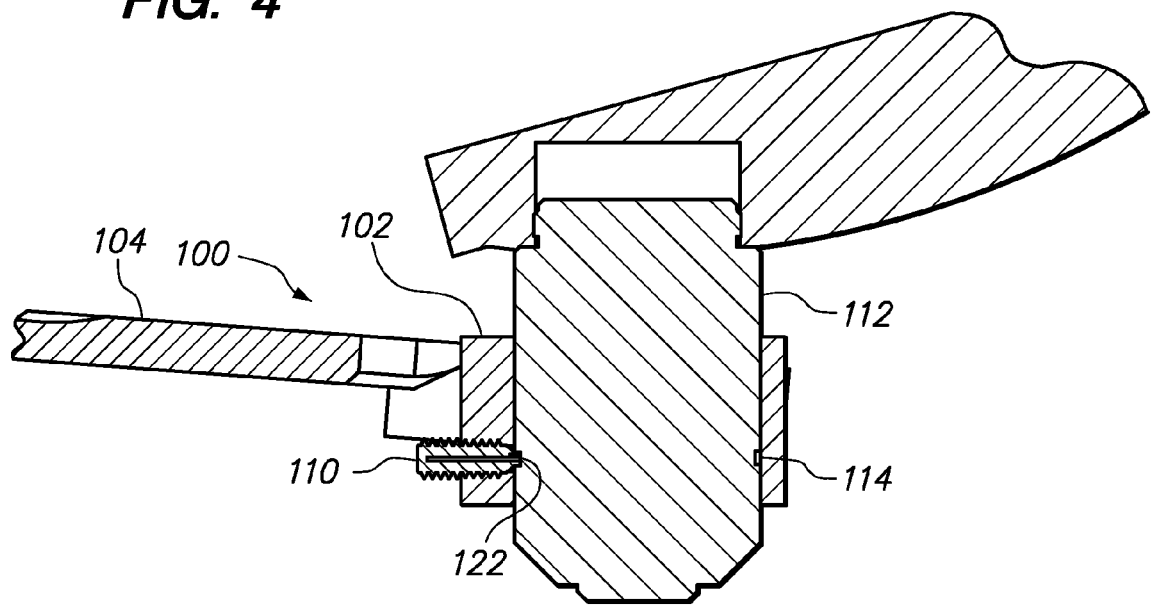

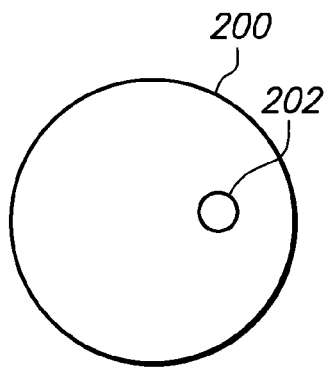
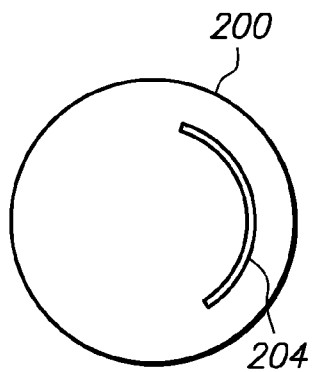
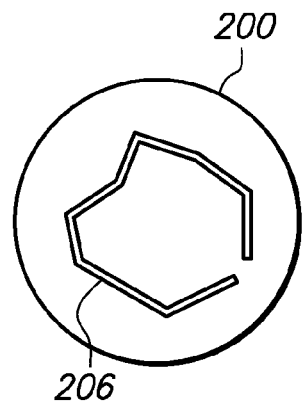
FIG. 7A    FIG. 7B    FIG. 7C
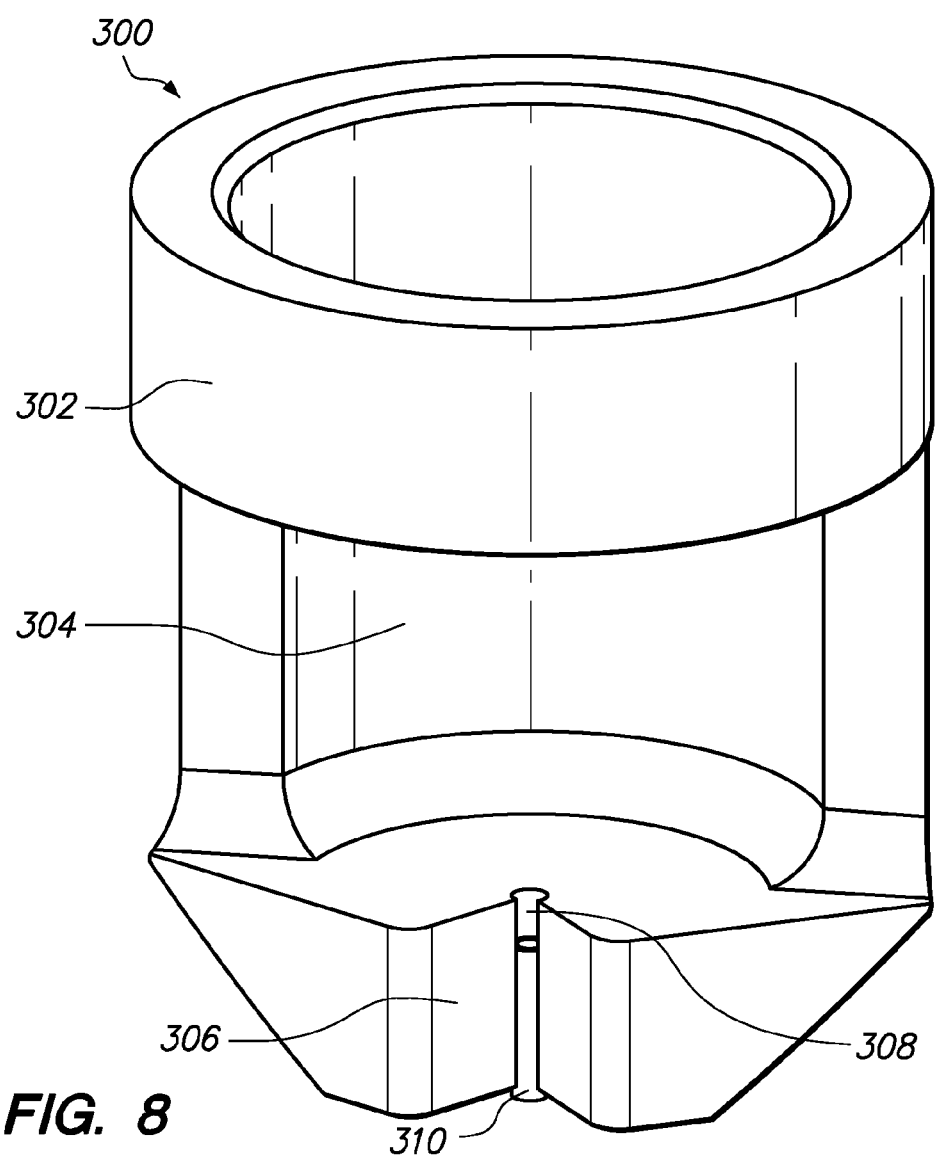
FIG. 8

MICROSCOPE SLIDE MARKING APPARATUS AND METHOD

RELATED APPLICATION DATA

The present application claims the benefit under 35 U.S.C. §119 to U.S. provisional patent application Ser. No. 61/086,422, filed Aug. 5, 2008. The foregoing application is hereby incorporated by reference into the present application in its entirety.

FIELD OF THE INVENTION

The present inventions pertain to apparatuses and methods for facilitating analysis of specimens, and more particularly to apparatuses and methods for marking microscope slides during specimen analysis.

BACKGROUND

Cytology is the branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "Pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed, because collection of cell samples for analysis is generally less invasive than traditional surgical pathological procedures such as biopsies, whereby a tissue specimen is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body fluids from the chest cavity, bladder, spinal canal, or other appropriate area. The cell samples are placed in solution and subsequently collected and transferred to a glass slide for viewing under magnification. Fixative and staining solutions are typically applied to the cells on the glass slide, often called a cell smear, for facilitating examination and for preserving the specimen for archival purposes.

In a laboratory, for example a cytology laboratory, a cytotechnologist examines numerous specimen slides under a microscope in order to analyze certain specimen cells of questionable nature. When such suspect cells are located, the cytotechnologist generally marks the slide at that point, so that he or she may recall the location of the cells at some later time for further examination. To date, cytotechnologists have marked slides generally by using one of several manual methods.

One such method exists where a cytotechnologist marks the area of the microscope slide in question with a marking pen. To accomplish this, the cytotechnologist must take his or her eyes away from the eyepieces of the microscope, position the pen tip in the field of view, return his or her eyes to the eyepieces of the microscope, and then manually mark the slide with the pen while viewing the slide under magnification through the eyepieces. This task is difficult in great part because of the sizes of typical objects of interest, about 50 to 100 microns, and typical fields of view, a few millimeters in diameter, and requires fine motor control and good eye-to-hand coordination. Further, this task requires the cytotechnologist to refocus his or her eyes, move his or her body into a potentially awkward position in order to place the pen tip at an area to be marked on the slide, and to make a guess as to the placement of the mark. Moreover, this method of slide marking can be time consuming and is typically not very accurate.

The cytotechnologist may also mark the area of interest with a marking pen while the slide is under microscopic review. To accomplish this, the cytotechnologist must steer the pen at an angle into a small field of view. This task is difficult because of the relative sizes of the pen tip, about 1 mm, and the field of view, which may be as small as about 2.2 mm in diameter with a 10× magnification objective lens. Once the pen is in the field of view, the cytotechnologist must attempt to draw a dot, an arc, or an "L" shape, which are conventionally used to mark areas of interest. Standard microscope configurations do not lend themselves to this marking method.

Another such method consists of marking a microscope slide by using an objective-like configuration marker. In this method, the cytotechnologist must take her eyes away from the microscope eyepiece, rotate the microscope nosepiece until the marking apparatus is in place, and then manually push the marking apparatus down onto the slide in order to mark the area in question. This method requires the cytotechnologist to refocus her eyes and to move her body into a potentially awkward position. Although this method is more accurate than the previously described method, it is still tedious and time consuming. Further, improperly rotating the microscope nosepiece may lead to errors in marking.

The Olympus' "U-Marker" marking apparatus is mounted to an objective lens. Once the cytotechnologist identifies an object of interest, he or she actuates a pen included in the marking apparatus onto the slide to make a mark using the U-Marker. Because the cytotechnologist cannot see through the microscope while the mark is made, they are marking blindly. Also, if the cytotechnologist marks the slide while looking through the microscope, they can only mark with a dot. Further, because the pen is actuated toward the slide at an angle, using the U-Marker has limited accuracy. Moreover, the mount of this method requires the use of custom pens, limiting the cytotechnologist's choice of marking instruments. In addition, the pen is connected to the marking apparatus in such a way as to preclude capping of the pen, which leads to evaporation of ink when the pen is not in use.

SUMMARY OF THE DISCLOSED INVENTIONS

In one embodiment, a detachable microscope pen mount for marking a microscope slide includes an attachment collar configured to secure to an objective lens, a lever secured to the attachment collar, a pen holder secured to the lever, and a pen secured to the pen holder and having a pen tip, where activating the lever moves the pen tip into a field of view and lowers the pen tip onto the microscope slide. The pen mount is configured to rotate around the objective lens.

In another embodiment, detachable pen guide for marking a microscope slide includes an attachment collar configured to secure to an objective lens, and a trough. The trough defines a shape, an arc, to be marked on the microscope slide. The attachment collar is rotatable around the objective lens. In yet another embodiment, the pen guide also includes a tube positioned inside of the trough and defining a shape to be marked on the microscope slide.

In still other embodiments, microscopes include the detachable microscope pen mount and detachable pen guide described above.

In another embodiment, a method of marking a microscope slide includes identifying an object of interest in a field of view, positioning the object of interest in a center of the field of view, depressing a lever to rotate a pen having a pen tip into the field of view, and further depressing a lever to lower the pen tip onto the microscope slide. The method also includes rotating the lever around an objective lens to form an arc on the microscope slide. In yet another embodiment, the method also includes moving a microscope stage while the pen tip is in contact with the microscope slide to form a shape on the microscope slide.

In still another embodiment, a method of marking a microscope slide includes identifying an object of interest in a field of view, positioning the object of interest in a center of the field of view, inserting a pen having a pen tip along a trough into a center of the trough, lowering the pen tip onto the microscope slide, and marking the microscope slide by tracing the inside of the center of the trough.

In yet another embodiment, a method of marking a microscope slide includes identifying an object of interest in a field of view, positioning the object of interest in a center of the field of view, inserting a pen having a pen tip along a trough until it reaches an outside surface of a tube in the trough, lowering the pen tip onto the microscope slide, and marking the microscope slide by tracing the outside of tube.

Other and further aspects and embodiments of the disclosed inventions are described in the detailed description of the accompanying drawings.

BRIEF DESCRIPTION OF THE DRAWINGS

It will be appreciated that the apparatuses shown in the drawings are not necessarily drawn to scale, with emphasis instead being placed on illustrating the various aspects and features of the illustrated embodiments, in which:

FIG. 3 is a perspective view of the microscope slide marking apparatus of FIG. 1 mounted on an objective lens of a microscope.

FIG. 4 is a side detailed cross sectional view of the microscope slide marking apparatus of FIG. 1 mounted on an objective lens of a microscope.

FIGS. 7a, 7b, and 7c are fields of view with various marks that can be made with the invention.

FIG. 8 is a perspective view of a microscope slide marking apparatus in accordance with another embodiment of the invention.

DETAILED DESCRIPTION OF THE ILLUSTRATED EMBODIMENTS

Embodiments of the disclosed apparatuses and methods to facilitate marking of microscope slides during specimen analysis will now be described. It is, however, expressly noted that the inventions disclosed herein are not limited to these described and illustrated embodiments, but also includes modifications that will be apparent to persons skilled in the art based on the disclosed embodiments.

Figure 1:
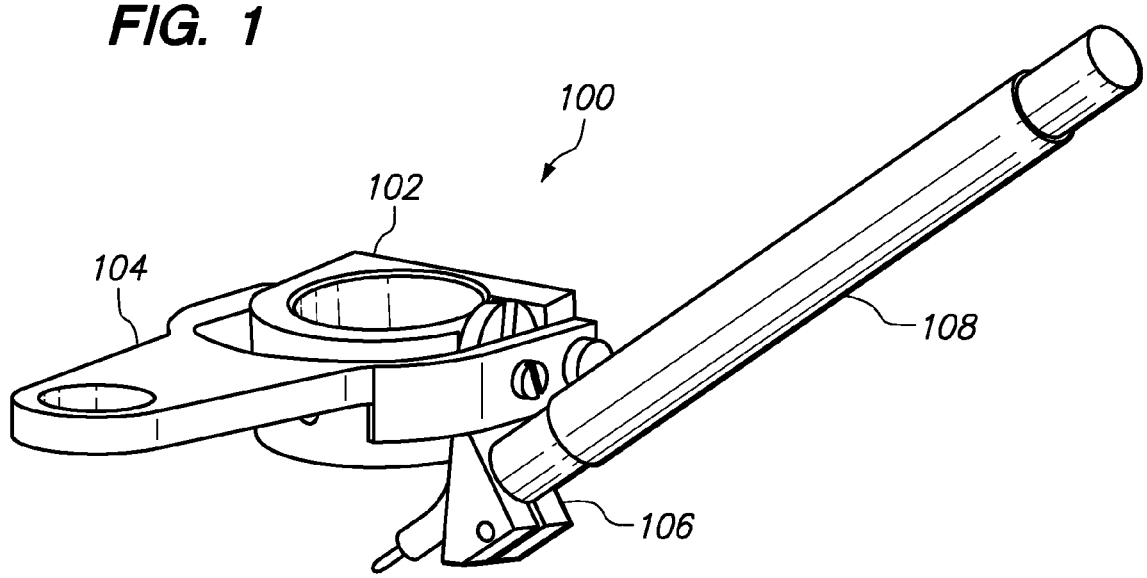
FIG. 1 is a perspective view of a microscope slide marking apparatus in accordance with an embodiment of the invention.

FIG. 1. depicts a microscope slide marking apparatus (100) according to an embodiment of the invention, including a collar (102), a lever (104), and a pen holder (106), which holds a pen (108). In this embodiment, the pen (108) is fixed to the pen holder (106) with a friction clamp at about 37 degrees from the microscope slide. While the pen holder (106) is configured to hold a variety of pens, a suitable pen is the Pilot Extra Fine Point Permanent Marker (item # SCA-UF). The parts of this embodiment are fabricated from anodized aluminum 6061-T6.

Figure 2:
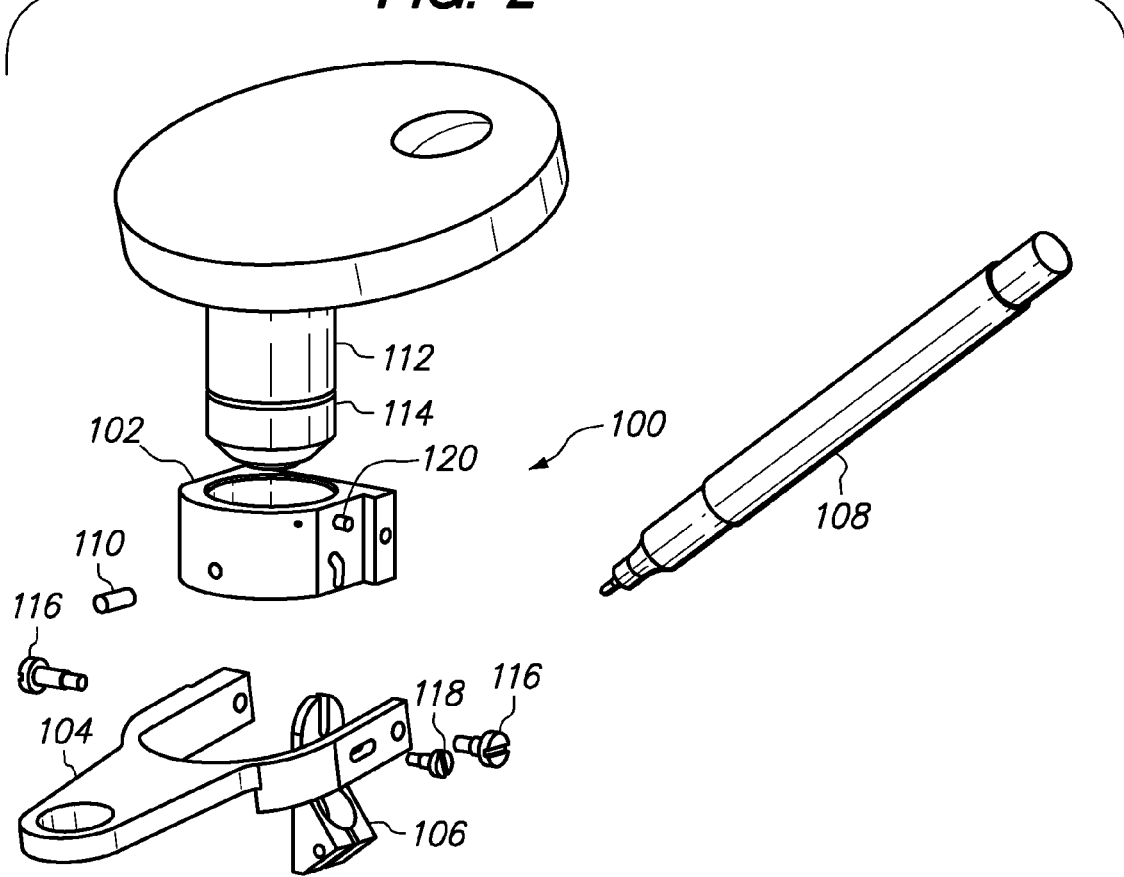
FIG. 2 is an exploded perspective view of the microscope slide marking apparatus of FIG. 1.

FIG. 2 illustrates the microscope slide marking apparatus (100) of FIG. 1 in an exploded view. FIG. 2 also shows a collar screw (110), which secures the collar (102) to an objective lens (112) by engaging an undercut ring (114) on the objective lens (112), such that the collar (102) can rotate around the objective lens (112). In addition, FIG. 2 shows two fulcrum screws (116), which secure the lever (104) to the collar (102), such that the lever (104) can rotate about the fulcrum screws (116). Further, FIG. 2 shows a slot screw (118), which secures the pen holder (106) to the collar (102) and the lever (104). The collar peg (120) is attached to the collar (102) and is also in contact with the pen holder (106).

As shown in FIG. 3, the collar (102) is free to rotate about the objective lens (112) in response to, for example, torque on the lever (104). The collar (102) is free to rotate, while it is secured to the objective lens (112) because the distal end (122) of the collar screw (110) rests in the undercut ring (114) on the objective lens (112), without engaging in a friction fit, as shown in FIG. 4. This arrangement prevents the slide marking apparatus (100) from sliding vertically off of the objective lens (112) while allowing the slide marking apparatus (100) to rotate about the objective lens (112).

Figure 5A:
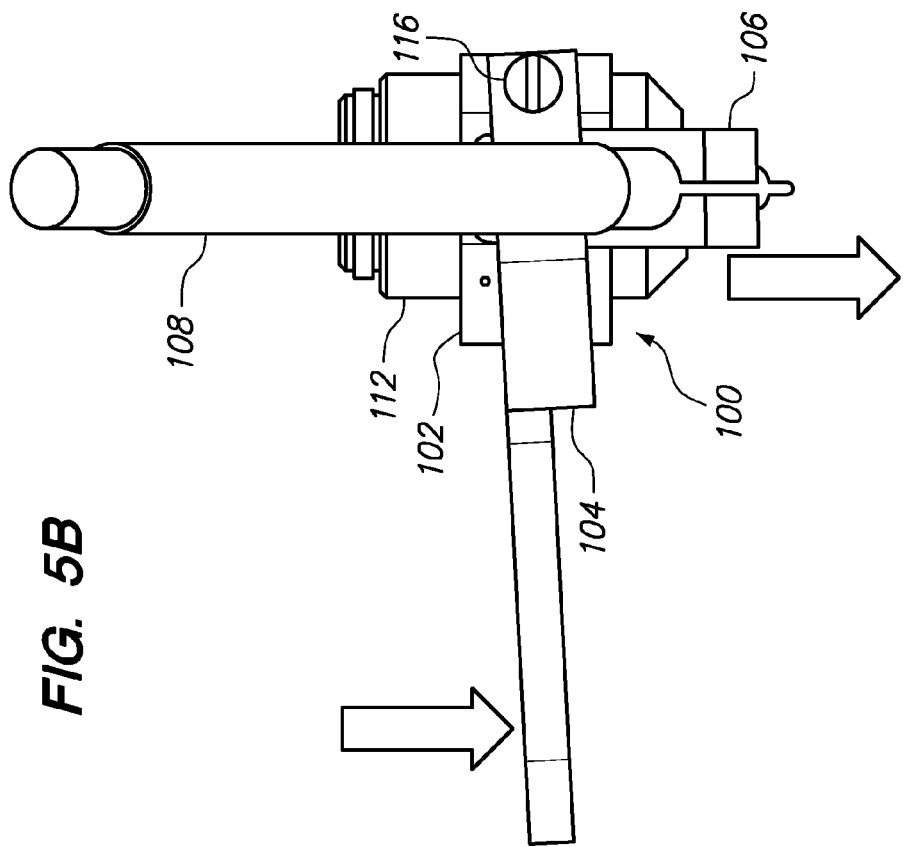
FIGS. 5a and 5b are side views of the microscope slide marking apparatus of FIG. 1 mounted on an objective lens of a microscope, during the early and late phases of actuation, respectively.
Figure 5B:
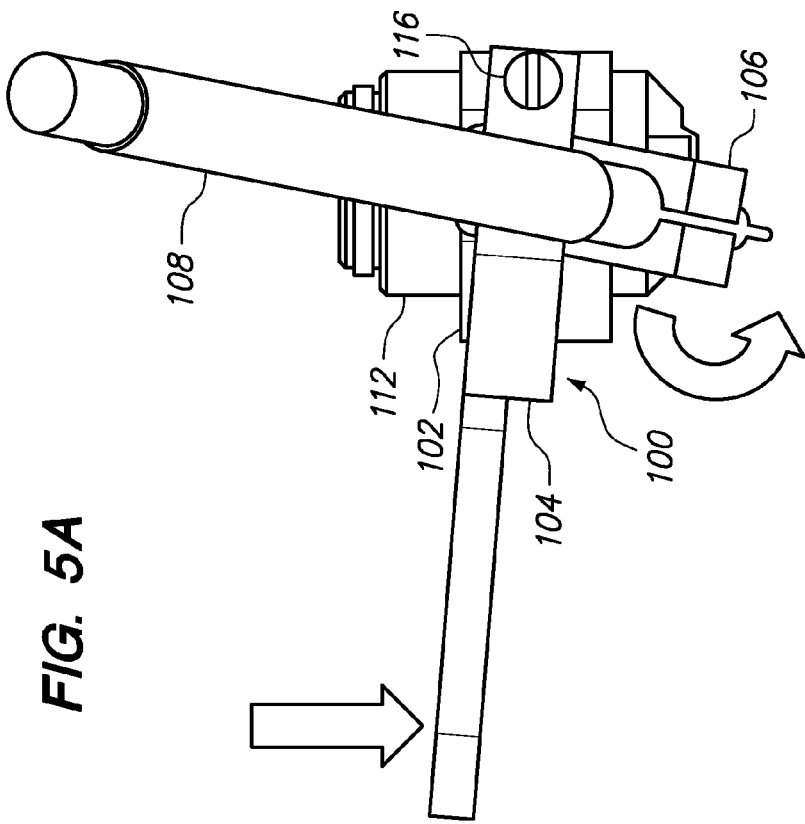

FIGS. 5a and 5b illustrate the early and late phases of actuation of the slide marking apparatus (100), respectively. When a user presses down on the proximal end of the lever (104), the lever (104) rotates about the fulcrum screws (116). In the early phase of actuation, as shown in FIG. 5a, rotation of the lever (104) rotates the tip of the pen (108) into the field of view of the objective lens (112). In the late phase of actuation, as shown in FIG. 5b, continued rotation of the lever (104) lowers the tip of the pen (108) into position to mark a microscope slide.

Figure 6A:
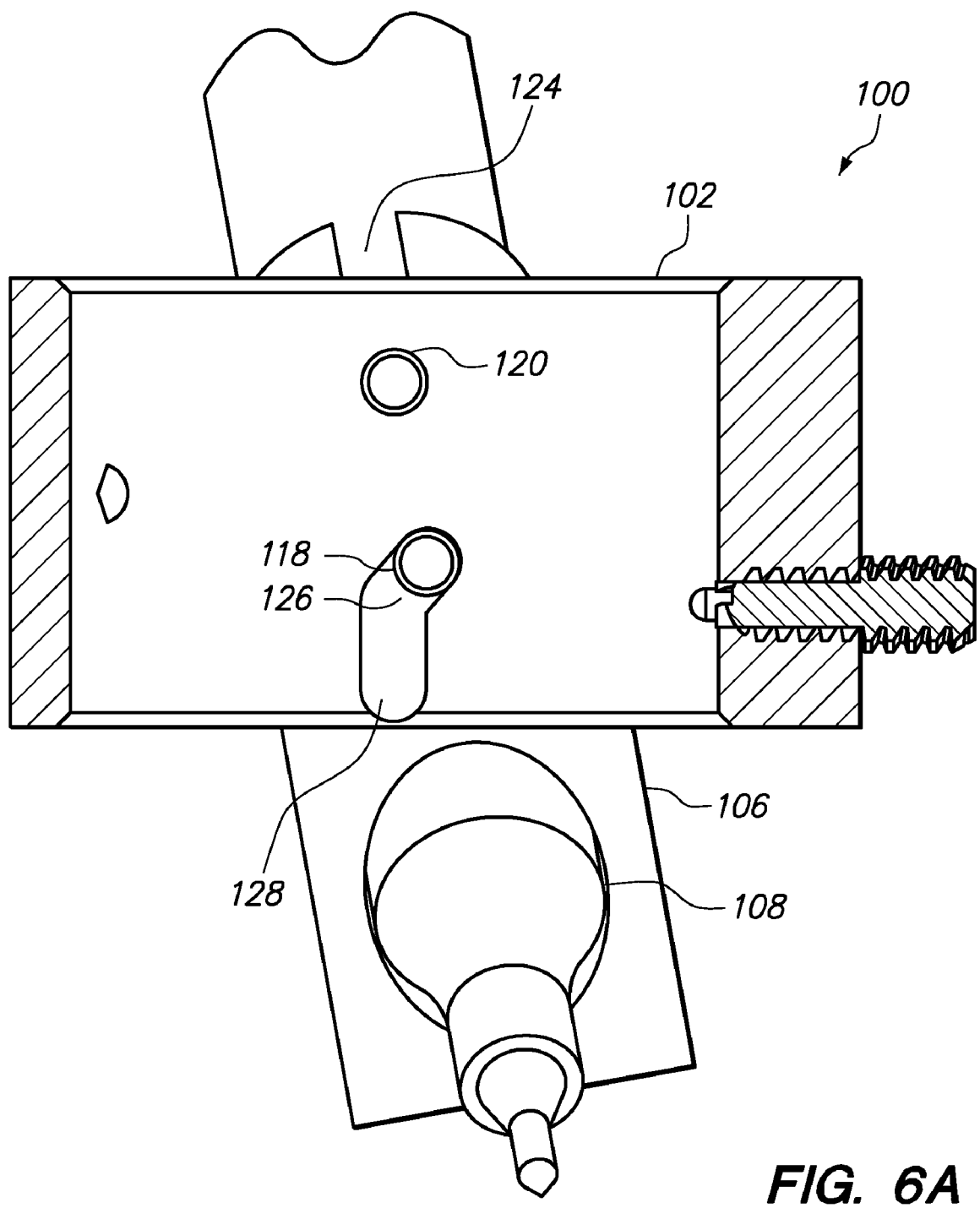
FIGS. 6a and 6b are side detailed cross sectional views of the microscope slide marking apparatus of FIG. 1, in the un-actuated and actuated positions, respectively.
Figure 6B:
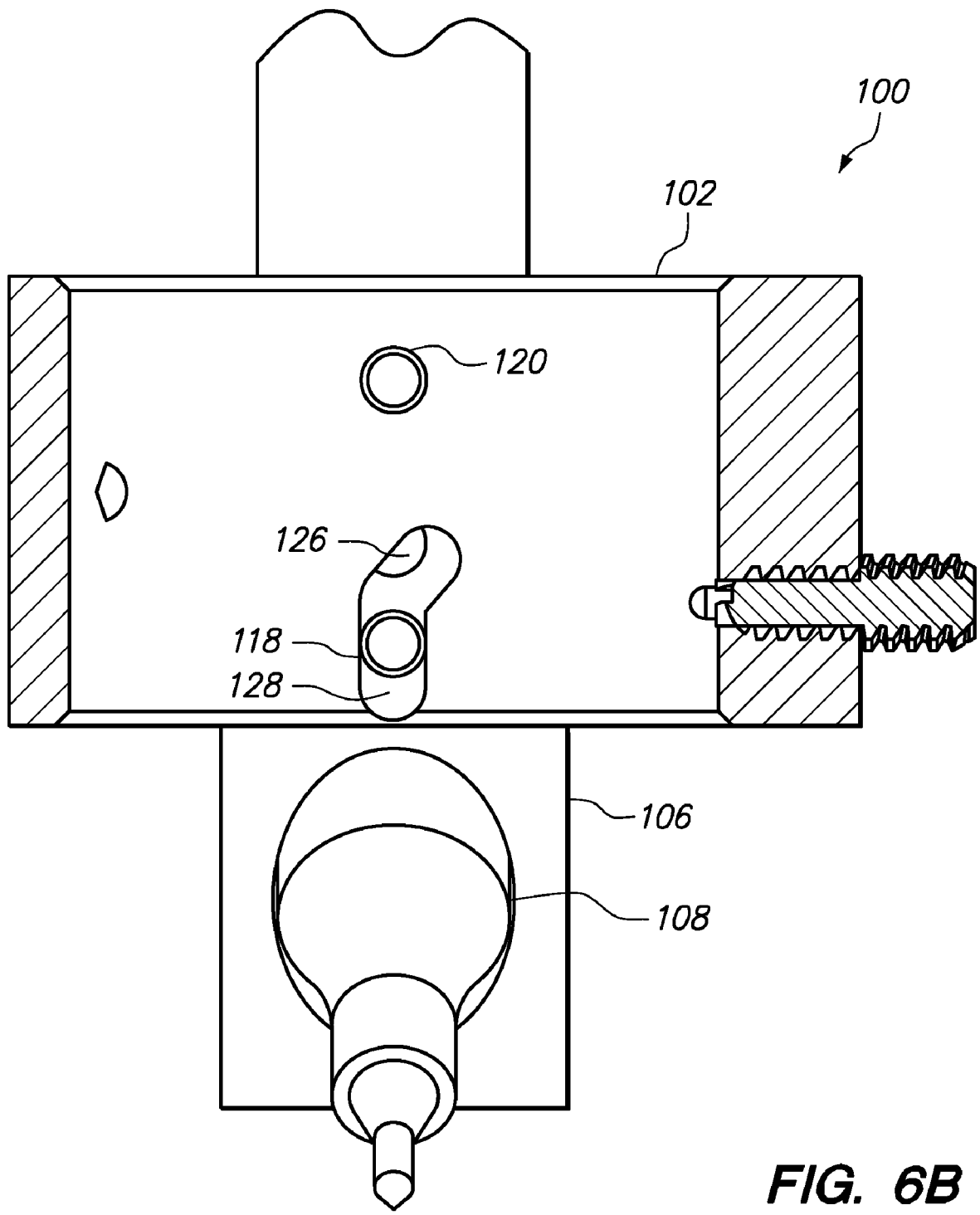

FIGS. 6a and 6b illustrate the early and late phases of actuation of the slide marking apparatus (100), respectively. The detail of FIGS. 6a and 6b also show the interaction of slot screw with the proximal slot (126) and the distal slot (128), which translates lowering of the lever (104) into rotation and lowering, respectively, of the pen holder (106) and pen (108).

As the lever (104) is lowered, the pen holder (106), which is secured to the lever (104) by the slot screw (118), is forced downward relative to the collar (102). Because the proximal slot (126), through which the slot screw (118) attached to the pen holder (106) travels, is slanted and because collar peg (120) restricts movement of the pen holder (106) along an upper slot (124), forcing the pen holder (106) downward through the proximal slot (126) rotates the pen holder (106) and the attached pen (108). Because the distal slot (128), through which the slot screw (118) attached to the pen holder (106) travels, is perpendicular to the microscope slide, forcing the pen holder (106) downward through the distal slot (128) lowers the pen holder (106) and the attached pen (108).

Figure 12A:
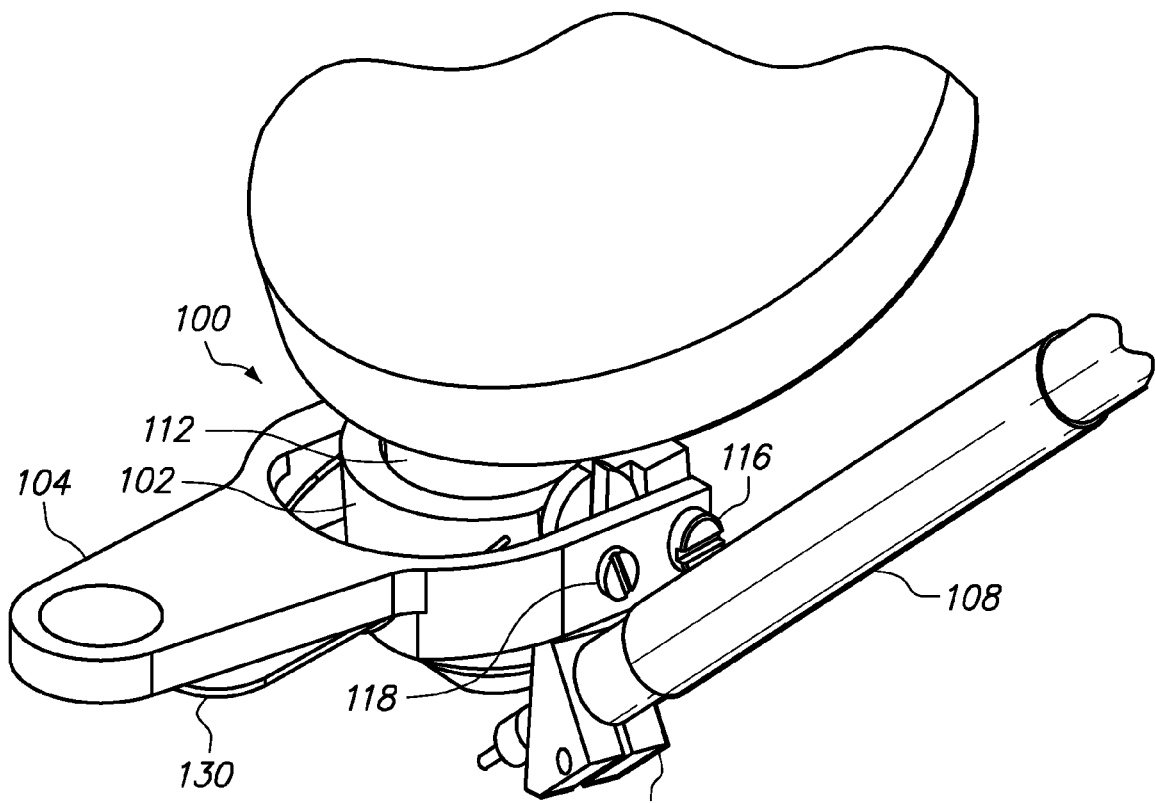
FIGS. 12a and 12b are detailed perspective views of the microscope slide marking apparatus of FIG. 1 mounted on an objective lens of a microscope.
Figure 12B:
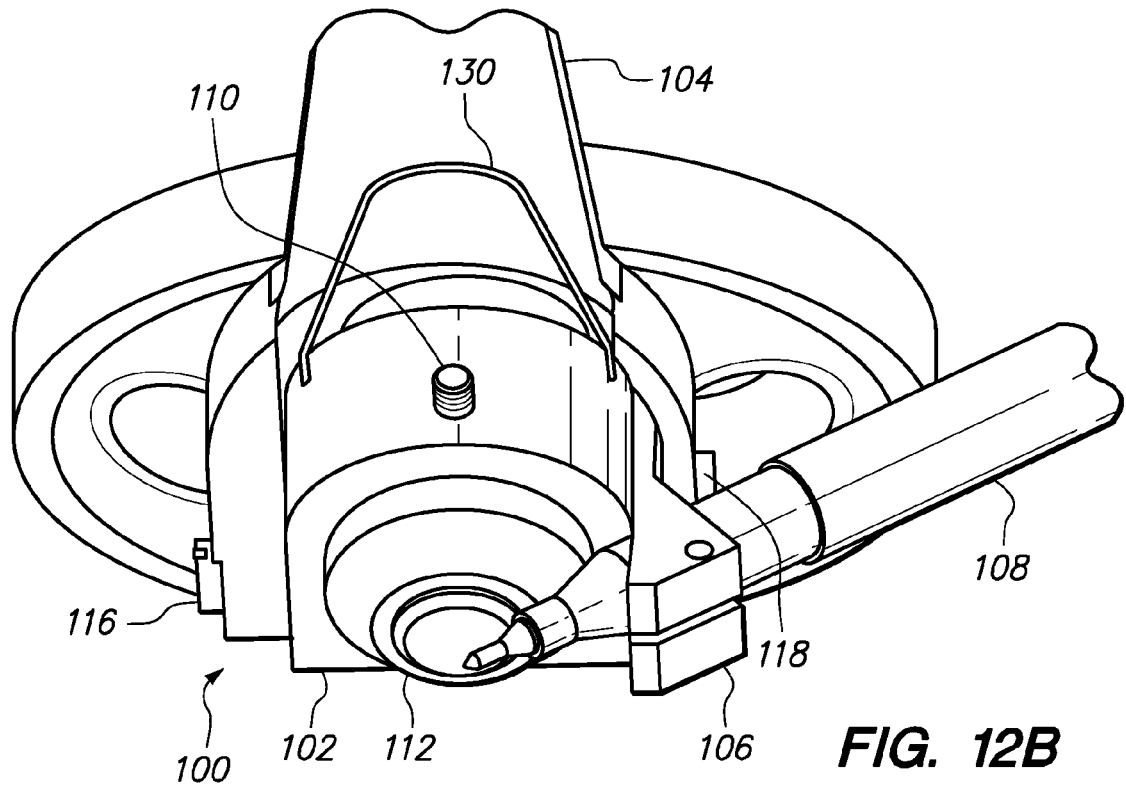

As shown in FIGS. 12a and 12b, a spring (130) is attached to the collar (102) below the lever (104). The spring (130) is a formed wire that presses up against the lever (104), biasing the lever (104) in an up or un-actuated position. Consequently, when there is no external pressure on the level (104) other than the spring (130), the pen (108) is rotated and raised away from the slide.

According to an embodiment of the invention using the microscope slide marking apparatus (100) describe above, a user marks a microscope slide by first identifying an object of interest. During the user's examination of the slide, the pen is rotated out of the field of view (200). Once the user has identified an object of interest, she presses down on the lever (104), thereby first rotating, and then lowering the pen (108) onto the slide. This marks the slide with a dot (202), as shown in FIG. 7a. The user can also rotate the slide marking apparatus (100) by rotating the lever (104) as described above. This marks the slide with an arc (204), as shown in FIG. 7b. Alternatively, the user can move the slide relative to the pen by moving the stage with the standard XY control knobs. This marks the slide with a variety of shape, such as the shape (206) shown in FIG. 7c.

Figure 9:
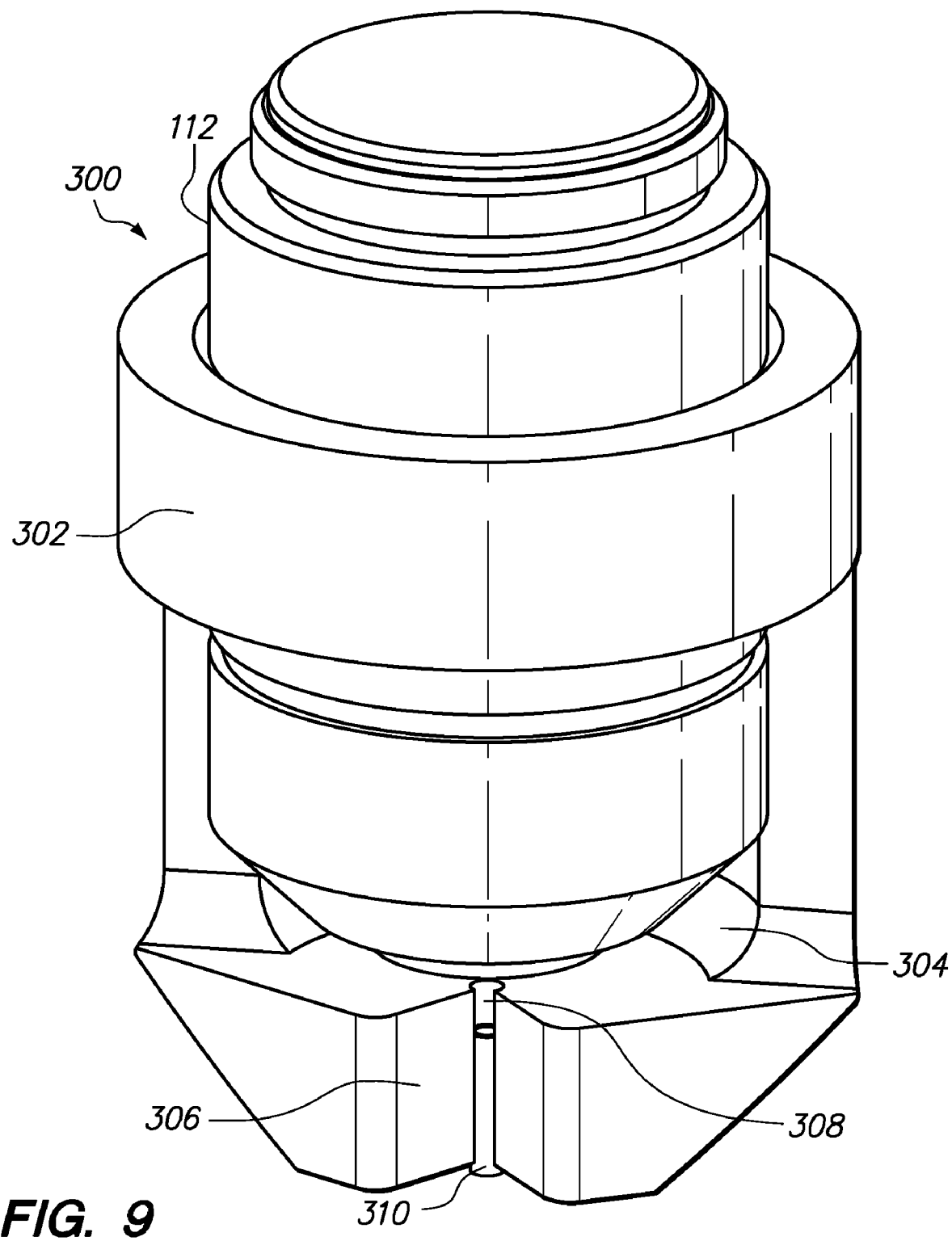
FIG. 9 is a perspective view of the microscope slide marking apparatus of FIG. 8 mounted on an objective lens of a microscope.
Figure 10:
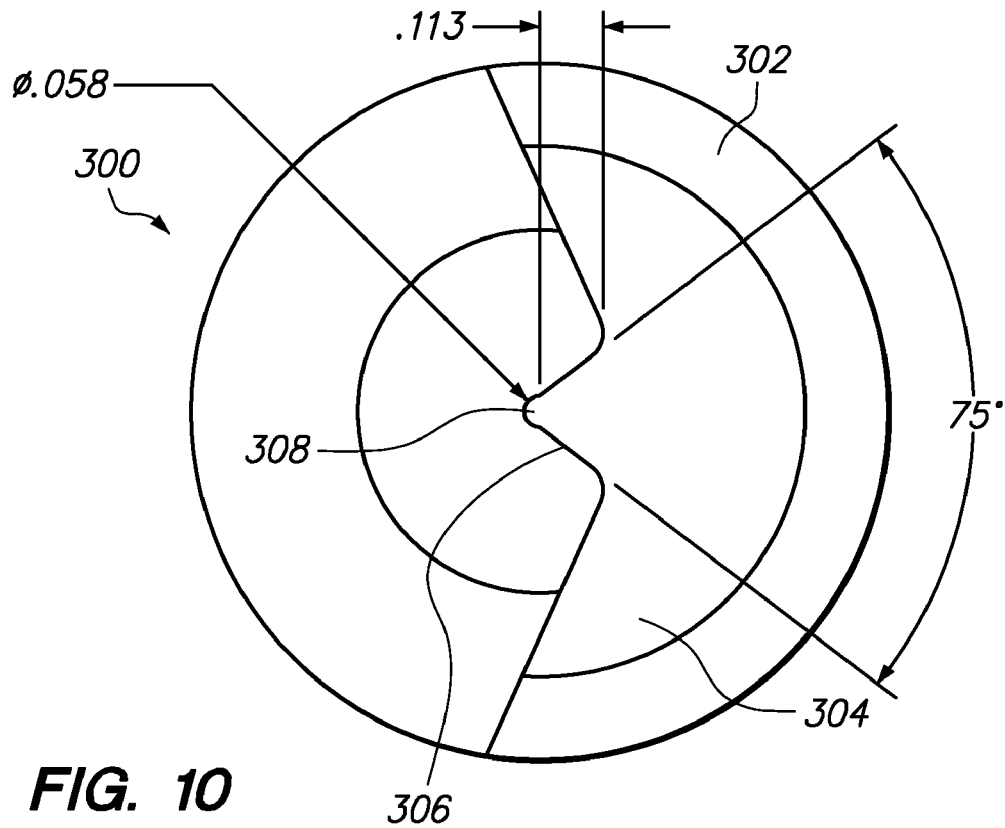
FIG. 10 is an overhead partial cutaway view of the microscope slide marking apparatus of FIG. 8.
Figure 11:
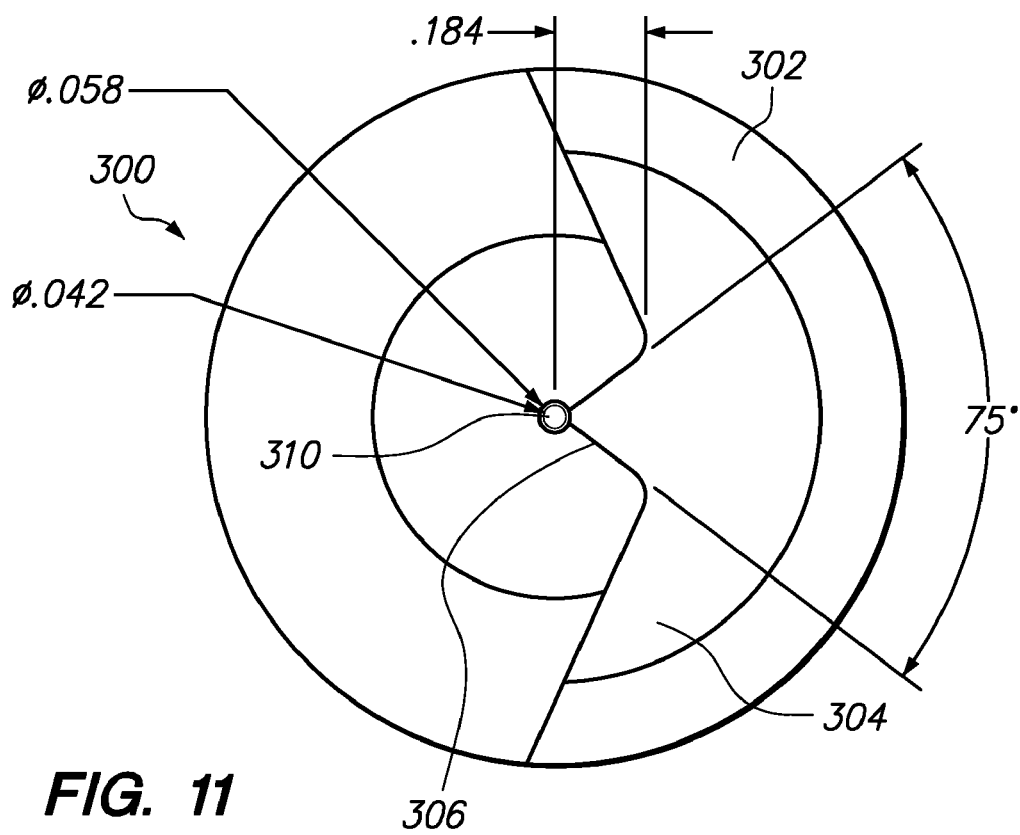
FIG. 11 is an overhead partial cutaway view of a microscope slide marking apparatus in accordance with yet another embodiment of the invention.

FIG. 8 shows another embodiment of the invention. This microscope slide marking apparatus (300) includes a retaining ring (302) which secures the slide marking apparatus (300) to an objective lens (112) via a snap fit connection, as shown in FIG. 9. The slide marking apparatus (300) also has an access area (304), which provides sufficient space for a pen to access the parts of the slide marking apparatus (300) closer to the microscope slide. Lower on the slide marking apparatus (300) is a trough (306), which is configured to guide a pen into the center (308) of the trough (306). In one embodiment, the center (308) of the trough (306) forms a stencil, which is configured to guide a pen to draw an arc near an object in the center of a field of view, as shown in FIG. 10, but tracing the inside of the stencil. In another embodiment, the center of the trough (306) contains a tube (310), which is also configured to guide a pen to draw an arc near an object in the center of a field of view, as shown in FIG. 11, by tracing the outside the tube. As seen in FIGS. 10 and 11, both the center (308) of the trough (306) and the center of the tube (310) are hollows and neither obstructs the view of a user examining a slide. While the microscope slide marking apparatus (300) is configured for use with a variety of pens, a suitable pen is the Pilot Extra Fine Point Permanent Marker (item # SCA-UF). The parts of this embodiment are fabricated from anodized aluminum 6061-T6.

According to an embodiment of the invention using the microscope slide marking apparatus (300) describe above, a user marks a microscope slide by first identifying an object of interest. Once the user has identified an object of interest, she rotates the microscope slide marking apparatus (300) until the access area (304) is accessible. Then the user inserts a pen along the trough (306) until it reaches the center (308) of the trough (306). Next, the user lowers the pen, which is in the center (308) of the trough (306), onto the slide and traces the inside of the center (308) of the trough (306) to make an arc on the slide near the object of interest.

Alternatively, the user inserts a pen along the trough (306) until it reaches the tube (310) in the center (308) of the trough (306). The user then lowers the pen onto the slide and traces the outside of the accessible portion of the tube (310) to make an arc on the slide near the object of interest.

Figure 13A:
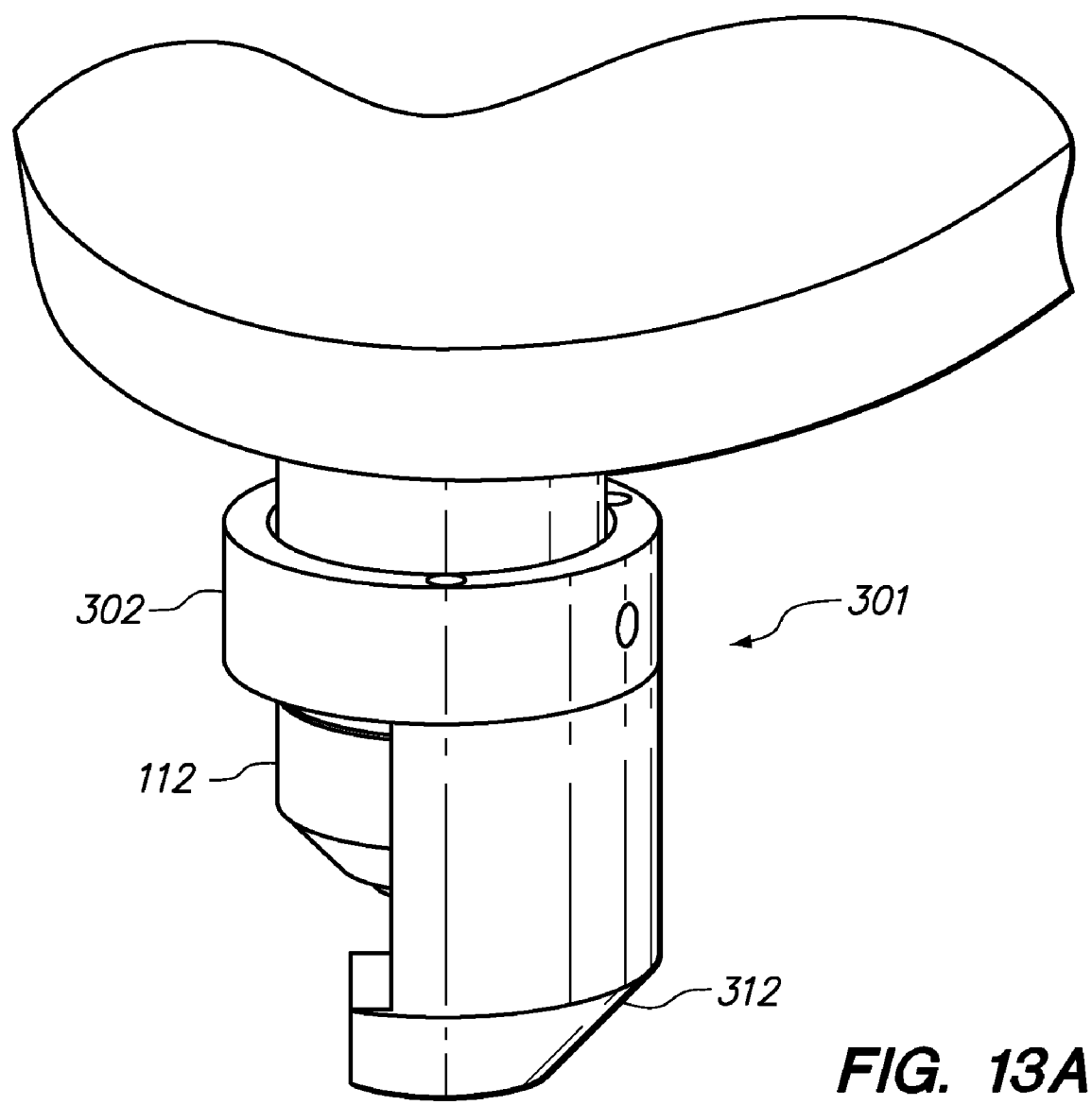
FIGS. 13a and 13b are perspective views of a microscope slide marking apparatus in accordance with yet another embodiment of the invention.
Figure 13B:
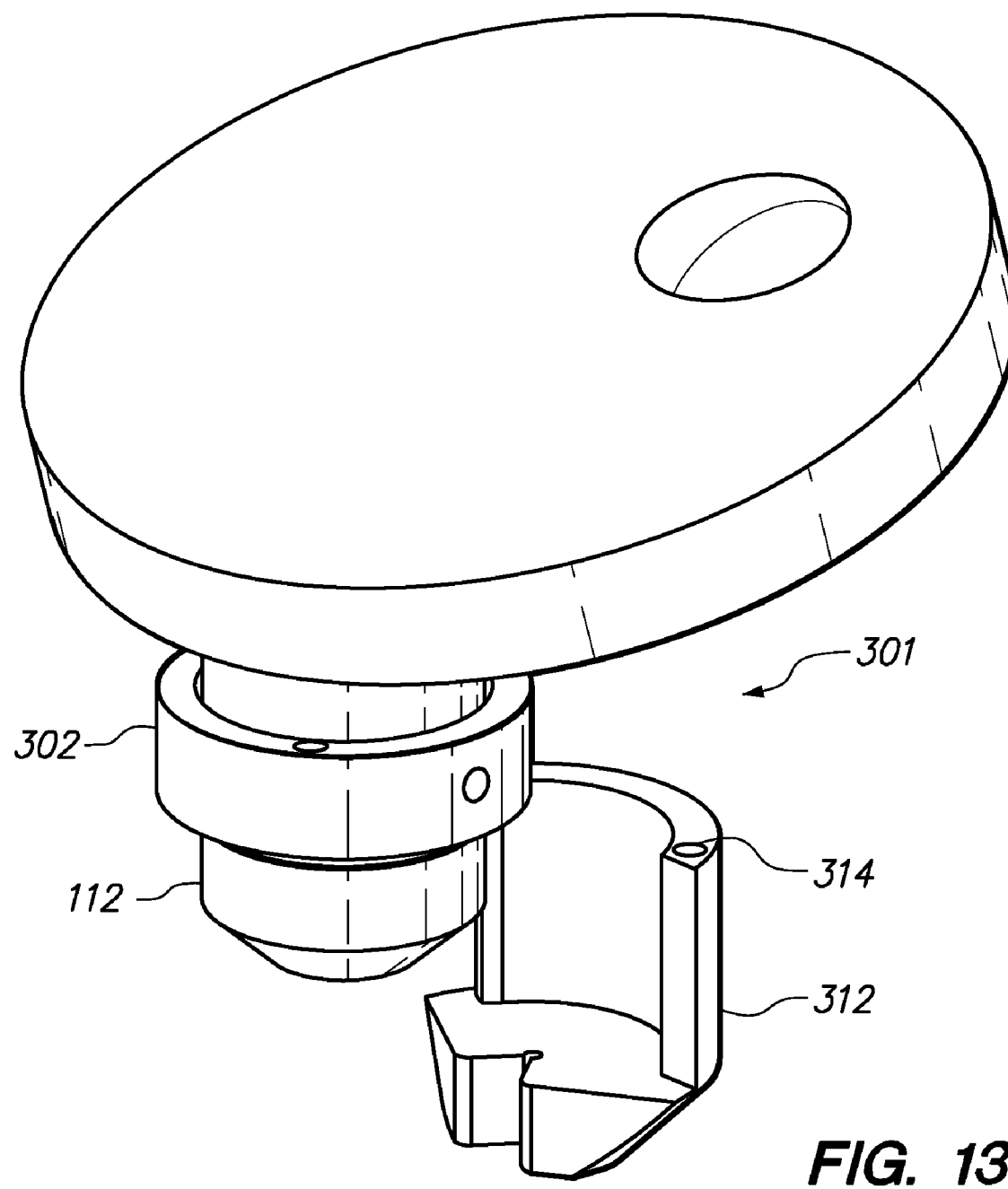
Figure 14:
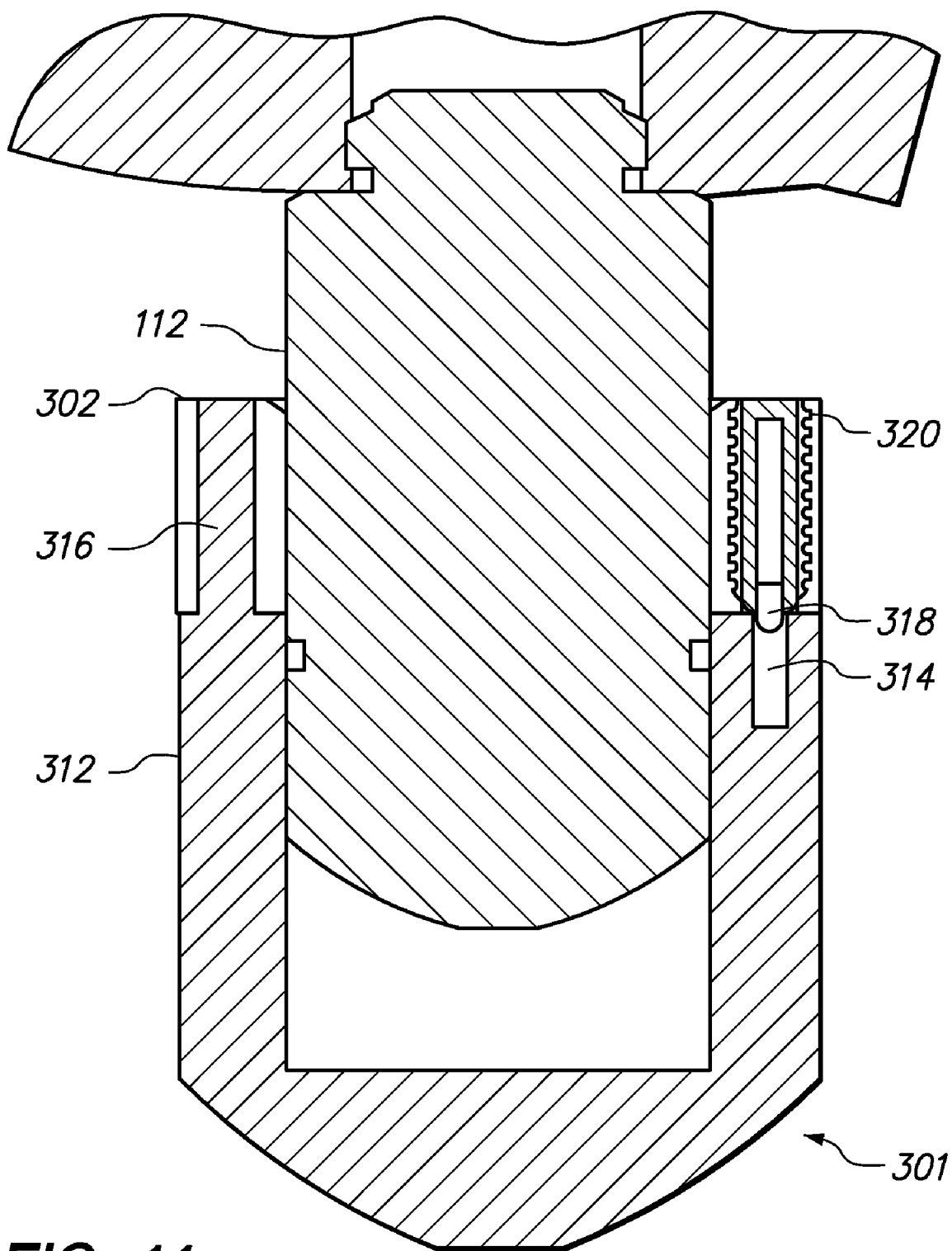
FIG. 14 is a cross sectional view of the slide marking apparatus of FIGS. 13a and 13b.

In another embodiment shown in FIGS. 13a, 13b, and 14, a slide marking apparatus (301) comprises a retaining ring (302) which is secured to an objective lens (112) via a snap fit connection. The slide marking apparatus (301) also comprises a guide section (312), which is connected to the retaining ring (302) via a pivot pin (316), as shown in FIG. 14. In the closed position, as shown in FIG. 13a, a detent (318) temporarily secures the guide section (312) to the retaining ring (302), by engaging a recess (314) in the guide section (312). The slide marking apparatus (301) further comprises a spring loaded plunger (320), which allows the detent (318) to withdraw into the retaining ring (302) under pressure to enable the guide section (312) to pivot out of the field of view in the open position, as shown in FIG. 13b. The guide section (312) comprises either a trough (306) or a tube (310) as described above for the slide marking apparatus (300) pictured in FIGS. 8, 9, and 10.

Using the slide marking apparatus (301) shown in FIGS. 13a, 13b, and 14, a user marks a microscope slide by first identifying an object of interest with the guide section (312) pivoted out of the field of view. Once the user has identified an object of interest, she pivots the guide section (312) into the field of view until the detent (318) engages the recess (314), temporarily locking the guide section (312) into position. Then the user marks the slide using the same method described above for the slide marking apparatus (300) pictured in FIGS. 8, 9, and 10. After marking the slide, the guide section (312) can be pivoted out of the field of view to allow unobstructed review of the slide.

The invention may be embodied in other specific forms besides and beyond those described herein. The foregoing embodiments are therefore to be considered in all respects illustrative rather than limiting.

What is claimed is:

1. A detachable microscope pen mount for marking a microscope slide, comprising:
   an attachment collar configured to secure to an objective lens;
   a lever secured to the attachment collar;
   a pen holder secured to the lever; and
   a pen secured to the pen holder and having a pen tip, wherein activating the lever both moves the pen tip into a field of view and lowers the pen tip onto the microscope slide in a direction substantially perpendicular to the microscope slide.

2. The microscope pen mount of claim 1, wherein the attachment collar is configured to rotate around the objective lens.

3. The microscope pen mount of claim 1, further comprising a slot screw, wherein the slot screw secures the pen holder to the attachment collar and the lever.

4. The microscope pen mount of claim 3, further comprising a slot having a proximal portion and a distal portion, wherein the slot screw is disposed in the slot, the proximal portion of the slot is oblique relative to the microscope slide, and the distal portion of the slot is perpendicular relative to the microscope slide.

5. The microscope pen mount of claim 4, wherein activating the lever moves the slot screw along the slot.

6. The microscope pen mount of claim 1, wherein the detachable pen mount is configured to hold the pen tip outside of the field of view until activating the lever moves the pen tip into the field of view.

7. A microscope, comprising:
an objective lens; and
a detachable microscope pen mount, wherein the pen mount comprises:
an attachment collar configured to secure to the objective lens;
a lever secured to the attachment collar;
a pen holder secured to the lever; and
a pen secured to the pen holder and having a pen tip, wherein activating the lever moves the pen tip into a field of view and lowers the pen tip onto the microscope slide in a direction substantially perpendicular to the microscope slide.

8. The microscope of claim 7, wherein the attachment collar is rotatable around the objective lens when secured thereto.

9. The microscope of claim 7, the microscope pen mount further comprising a slot screw, wherein the slot screw secures the pen holder to the attachment collar and the lever.

10. The microscope of claim 9, the microscope pen mount further comprising a slot having a proximal portion and a distal portion, wherein the slot screw is disposed in the slot, the proximal portion of the slot is oblique relative to the microscope slide, and the distal portion of the slot is perpendicular relative to the microscope slide.

11. The microscope of claim 10, wherein activating the lever moves the slot screw along the slot.

12. The microscope of claim 7, wherein the detachable pen mount is configured to hold the pen tip outside of the field of view until activating the lever moves the pen tip into the field of view.

13. A method of marking a microscope slide, comprising:
identifying an object of interest in a field of view;
positioning the object of interest in a center of the field of view;
depressing a lever to rotate a pen having a pen tip into the field of view; and
further depressing the lever to lower the pen tip onto the microscope slide in a direction substantially perpendicular to the microscope slide.

14. The method of claim 13, further comprising rotating the lever around an objective lens to form an arc on the microscope slide.

15. The method of claim 13, further comprising moving a microscope stage while the pen tip is in contact with the microscope slide to form a shape on the microscope slide.

16. A method of marking a microscope slide, comprising:
identifying an object of interest in a field of view;
positioning the object of interest in a center of the field of view;
inserting a pen having a pen tip along a trough into a center of the trough;
lowering the pen tip onto the microscope slide; and
marking the microscope slide.

17. The method of claim 16, wherein marking the microscope slide comprises tracing the inside of the center of the trough.

18. A method of marking a microscope slide, comprising:
identifying an object of interest in a field of view;
positioning the object of interest in a center of the field of view;
inserting a pen having a pen tip along a trough until it reaches an outside surface of a tube in the trough;
lowering the pen tip onto the microscope slide; and
marking the microscope slide.

19. The method of claim 18, wherein marking the microscope slide comprises tracing the outside of the tube.

* * * * *